(12) United States Patent
Han et al.

(10) Patent No.: US 12,135,489 B2
(45) Date of Patent: Nov. 5, 2024

(54) ANTI-PEEPING PANEL, PREPARATION METHOD, DRIVING METHOD, AND DISPLAY DEVICE

(71) Applicant: BOE Technology Group Co., Ltd., Beijing (CN)

(72) Inventors: Cheng Han, Beijing (CN); Xin Li, Beijing (CN); Xing Fan, Beijing (CN); Qixiao Wu, Beijing (CN); Songquan Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/785,034

(22) PCT Filed: Aug. 4, 2021

(86) PCT No.: PCT/CN2021/110672
§ 371 (c)(1),
(2) Date: Jun. 13, 2022

(87) PCT Pub. No.: WO2022/052687
PCT Pub. Date: Mar. 17, 2022

(65) Prior Publication Data
US 2024/0184151 A1  Jun. 6, 2024

(30) Foreign Application Priority Data

Sep. 11, 2020  (CN) .......................... 202010956361.9

(51) Int. Cl.
*G02F 1/137* (2006.01)
*G02F 1/13* (2006.01)
(Continued)

(52) U.S. Cl.
CPC ........ *G02F 1/13737* (2013.01); *G02F 1/1323* (2013.01); *G02F 1/13345* (2021.01);
(Continued)

(58) Field of Classification Search
CPC ............ G02F 1/13737; G02F 1/13731; G02F 1/13725; G02F 1/13775; G02F 1/133365; G02F 1/1323; G02F 1/13475
See application file for complete search history.

(56) References Cited

U.S. PATENT DOCUMENTS 9,971,222 B2 * 5/2018 Kim ...................... G02F 1/1334
2013/0082986 A1    4/2013 Yamauchi
(Continued)

FOREIGN PATENT DOCUMENTS

CN         101059607 A     10/2007
CN         107085327 A      8/2017
(Continued)

*Primary Examiner* — Paisley L Wilson
(74) *Attorney, Agent, or Firm* — IPro, PLLC

(57) ABSTRACT

An anti-peeping panel, a preparation method, a driving method, and a display device. The anti-peeping panel includes: a first substrate; a second substrate; a composite material layer; first and second transparent electrode layers. The first and second transparent electrode layers includes first and second elongate electrodes respectively; orthographic projections of at least one first and second elongate electrode on the first substrate have a first overlapping region; the composite material layer includes first and second composite regions, the second composite region overlaps with the first overlapping region; when an electric field of first frequency exists between first and second elongate electrodes, the second composite region shades light, the first composite region transmits light; when an electric field of second frequency exists between first and second elongate electrodes, the second composite region transmits light, the first composite region transmits light; the first frequency is different from the second frequency.

12 Claims, 10 Drawing Sheets

(51) Int. Cl.
    *G02F 1/1334*    (2006.01)
    *G02F 1/1337*    (2006.01)
    *G02F 1/1343*    (2006.01)
    *G02F 1/1347*    (2006.01)

(52) U.S. Cl.
    CPC ...... *G02F 1/13378* (2013.01); *G02F 1/13439* (2013.01); *G02F 1/13475* (2013.01); *G02F 1/134381* (2021.01)

(56)           References Cited

U.S. PATENT DOCUMENTS

| | | |
|---|---|---|
| 2016/0018681 A1 | 1/2016 | Chien et al. |
| 2019/0377207 A1* | 12/2019 | Zhou .................. E06B 9/24 |
| 2020/0004058 A1 | 1/2020 | Harrold et al. |
| 2020/0012159 A1 | 1/2020 | Wang |
| 2021/0048702 A1 | 2/2021 | Yuan et al. |
| 2021/0109388 A1 | 4/2021 | You et al. |

FOREIGN PATENT DOCUMENTS

| | | |
|---|---|---|
| CN | 207249283 U | 4/2018 |
| CN | 108490703 A | 9/2018 |
| CN | 108803113 A | 11/2018 |
| CN | 109782464 A | 5/2019 |
| CN | 110456538 A | 11/2019 |
| CN | 110764291 A | 2/2020 |
| CN | 112034640 A | 12/2020 |

* cited by examiner

ANTI-PEEPING PANEL, PREPARATION METHOD, DRIVING METHOD, AND DISPLAY DEVICE

CROSS REFERENCE TO RELATED APPLICATIONS

The present application is a National Stage of International Application No. PCT/CN2021/110672, filed on Aug. 4, 2021, which claims priority to Chinese Patent Application No. CN 202010956361.9 filed on Sep. 11, 2020, entitled "ANTI-PEEPING PANEL, PREPARATION METHOD, DRIVING METHOD, AND DISPLAY DEVICE", the entire contents of which are incorporated herein by reference.

FIELD

The present disclosure relates to the technical field of display, in particular to an anti-peeping panel, a preparation method, a driving method and a display device.

BACKGROUND

Generally speaking, a screen of a display device usually has a display effect with a wide viewing angle, but in some cases, such as processing data or other confidential data in a public place, the display effect with the wide viewing angle makes the data in processing easy to be peeped at by other people, resulting in leakage of private information.

SUMMARY

An anti-peeping panel provided by an embodiment of the present disclosure includes:
  a first substrate;
  a second substrate, arranged opposite to the first substrate;
  a composite material layer, encapsulated between the first substrate and the second substrate;
  a first transparent electrode layer, located on a side facing the composite material layer, of the first substrate and including a plurality of first strip-shaped electrodes which are arranged at intervals; and
  a second transparent electrode layer, located on a side facing the composite material layer, of the second substrate and including a plurality of second strip-shaped electrodes which are arranged at intervals, wherein an orthographic projection of at least one first strip-shaped electrode on the first substrate and an orthographic projection of at least one second strip-shaped electrode on the first substrate have a first overlapping region;
  the composite material layer includes a first composite region and a second composite region, the second composite region overlaps the first overlapping region, and the composite material layer in the second composite region at least includes two different polymer network skeleton structures;
  in response to an electric field of a first frequency being between the first strip-shaped electrodes and the second strip-shaped electrodes, the second composite region shades light, and the first composite region transmits light;
  in response to an electric field of a second frequency being between the first strip-shaped electrodes and the second strip-shaped electrodes, the second composite region transmits light, and the first composite region transmits light;
  the first frequency is different from the second frequency.

In some examples, the first frequency is smaller than the second frequency:
  the composite material layer in the second composite region includes: a first polymer network skeleton structure, a second polymer network skeleton structure, liquid crystal molecules, and positive dichroic dye molecules;
  the composite material layer in the first composite region includes: the first polymer network skeleton structure, the liquid crystal molecules, and the positive dichroic dye molecules.

In some examples, the liquid crystal molecules and the positive dichroic dye molecules in the first composite region are respectively arranged parallel to the first substrate:
  in response to the second composite region shading light, the liquid crystal molecules and the positive dichroic dye molecules in the second composite region are respectively arranged perpendicular to the first substrate;
  in response to the second composite region transmitting light, the liquid crystal molecules and the positive dichroic dye molecules in the second composite region are respectively arranged parallel to the first substrate.

In some examples, the first frequency is larger than the second frequency:
  the composite material layers in the second composite region and the first composite region respectively include: a first polymer network skeleton structure, a second polymer network skeleton structure, liquid crystal molecules, and negative dichroic dye molecules.

In some examples, the liquid crystal molecules and the negative dichroic dye molecules in the first composite region are respectively arranged perpendicular to the first substrate:
  in response to the second composite region shading light, the liquid crystal molecules and the negative dichroic dye molecules in the second composite region are respectively arranged parallel to the first substrate;
  in response to the second composite region transmitting light, the liquid crystal molecules and the negative dichroic dye molecules in the second composite region are respectively arranged perpendicular to the first substrate.

In some examples, the anti-peeping panel further includes:
  a third transparent electrode layer, located between the first substrate and the first transparent electrode layer, wherein an orthographic projection of the third transparent electrode layer on the first substrate and gaps between orthographic projections of the first strip-shaped electrodes on the first substrate have overlapping regions;
  a first insulating layer, located between the third transparent electrode layer and the first transparent electrode layer;
  a fourth transparent electrode layer, located between the second substrate and the second transparent electrode layer, wherein an orthographic projection of the fourth transparent electrode layer on the second substrate and gaps between orthographic projections of the second strip-shaped electrodes on the second substrate include overlapping regions; and a second insulating layer, located between the fourth transparent electrode layer and the second transparent electrode layer.

In some examples, the orthographic projection of the third transparent electrode layer on the first substrate covers the first substrate; and/or the orthographic projection of the fourth transparent electrode layer on the second substrate covers the second substrate.

In some examples, the first polymer network skeleton structures are polymer cross-linked network skeleton structures, and the second polymer network skeleton structures are polymer perpendicular network skeleton structures.

In some examples, an orthographic projection of one of the first strip-shaped electrodes on the first substrate overlaps an orthographic projection of one of the second strip-shaped electrodes on the first substrate.

In some examples, the anti-peeping panel further includes:

a first alignment layer, located between the first transparent electrode layer and the composite material layer, wherein an orthographic projection of the first alignment layer on the first substrate covers the first substrate; and a second alignment layer, located between the second transparent electrode layer and the composite material layer, wherein an orthographic projection of the second alignment layer on the second substrate covers the second substrate.

A display device provided by an embodiment of the present disclosure includes:

a display panel; and an anti-peeping panel, located on a light emitting side of the display panel;

the anti-peeping panel is the above anti-peeping panel.

A preparation method of an anti-peeping panel provided by an embodiment of the present disclosure includes:

forming a first transparent electrode layer on a first substrate, wherein the first transparent electrode layer includes a plurality of first strip-shaped electrodes which are arranged at intervals;

forming a second transparent electrode layer on a second substrate, wherein the second transparent electrode layer includes a plurality of second strip-shaped electrodes which are arranged at intervals, and an orthographic projection of at least one first strip-shaped electrode on the first substrate and an orthographic projection of at least one second strip-shaped electrode on the first substrate have a first overlapping region;

performing box alignment operation on the first substrate and the second substrate to form a box-shaped structure; and forming a composite material layer in the box-shaped structure formed after box alignment operation on the first substrate and the second substrate, wherein the composite material layer has a first composite region and a second composite region, the second composite region overlaps the first overlapping region, and the composite material layer in the second composite region at least includes two different polymer network skeleton structures: when an electric field of a first frequency is applied between the first strip-shaped electrodes and the second strip-shaped electrodes, the second composite region shades light, and the first composite region transmits light; when an electric field of a second frequency is applied between the first strip-shaped electrodes and the second strip-shaped electrodes, the second composite region transmits light, and the first composite region transmits light; and the first frequency is different from the second frequency.

In some examples, the first frequency is smaller than the second frequency; and the performing box alignment operation on the first substrate and the second substrate to form the box-shaped structure specifically includes:

infusing a mixed solution of liquid crystal molecules, polymerizable monomers, positive dichroic dye molecules, and a photoinitiator into the box-shaped structure formed after box alignment operation on the first substrate and the second substrate;

performing a first ultraviolet light irradiation on the box-shaped structure infused with the mixed solution, so that part of polymerizable monomers in the polymerizable monomers are prepolymerized to form a first polymer network skeleton structure;

applying corresponding voltages to the first strip-shaped electrodes and the second strip-shaped electrodes, so that an electric field of a third frequency is formed between the first strip-shaped electrodes and the second strip-shaped electrodes; and performing a second ultraviolet light irradiation on the box-shaped structure, so that other polymerizable monomers in the polymerizable monomers are prepolymerized to form a second polymer network skeleton structure.

In some examples, the first frequency is larger than the second frequency; and the performing box alignment operation on the first substrate and the second substrate to form the box-shaped structure includes:

infusing a mixed solution of liquid crystal molecules, polymerizable monomers, negative dichroic dye molecules, and a photoinitiator into the box-shaped structure formed after box alignment operation on the first substrate and the second substrate;

performing a first ultraviolet light irradiation on the box-shaped structure infused with the mixed solution, so that part of polymerizable monomers in the polymerizable monomers are prepolymerized to form a first polymer network skeleton structure;

applying corresponding voltages to the first strip-shaped electrodes, the second strip-shaped electrodes, a third transparent electrode layer and a fourth transparent electrode layer, so that an electric field of a fourth frequency is formed between the first strip-shaped electrodes and the second strip-shaped electrodes and an electric field of the fourth frequency is formed between the third transparent electrode layer and the fourth transparent electrode layer; and performing a second ultraviolet light irradiation on the box-shaped structure, so that other polymerizable monomers in the polymerizable monomers are prepolymerized to form a second polymer network skeleton structure.

A driving method of an anti-peeping panel provided by an embodiment of the present disclosure includes:

applying, in an anti-peeping display mode, opposite voltages to a first strip-shaped electrode and a second strip-shaped electrode so that an electric field of a first frequency exists between the first strip-shaped electrode and the second strip-shaped electrode, and controlling a second composite region to shade light and a first composite region to transmit light; and applying, in a shared display mode, corresponding voltages to the first strip-shaped electrode and the second strip-shaped electrode so that an electric field of a second frequency exists between the first strip-shaped electrode and the second strip-shaped electrode, and controlling the second composite region to transmit light and the first composite region to transmit light.

DETAILED DESCRIPTION OF THE EMBODIMENTS

Figure 1:
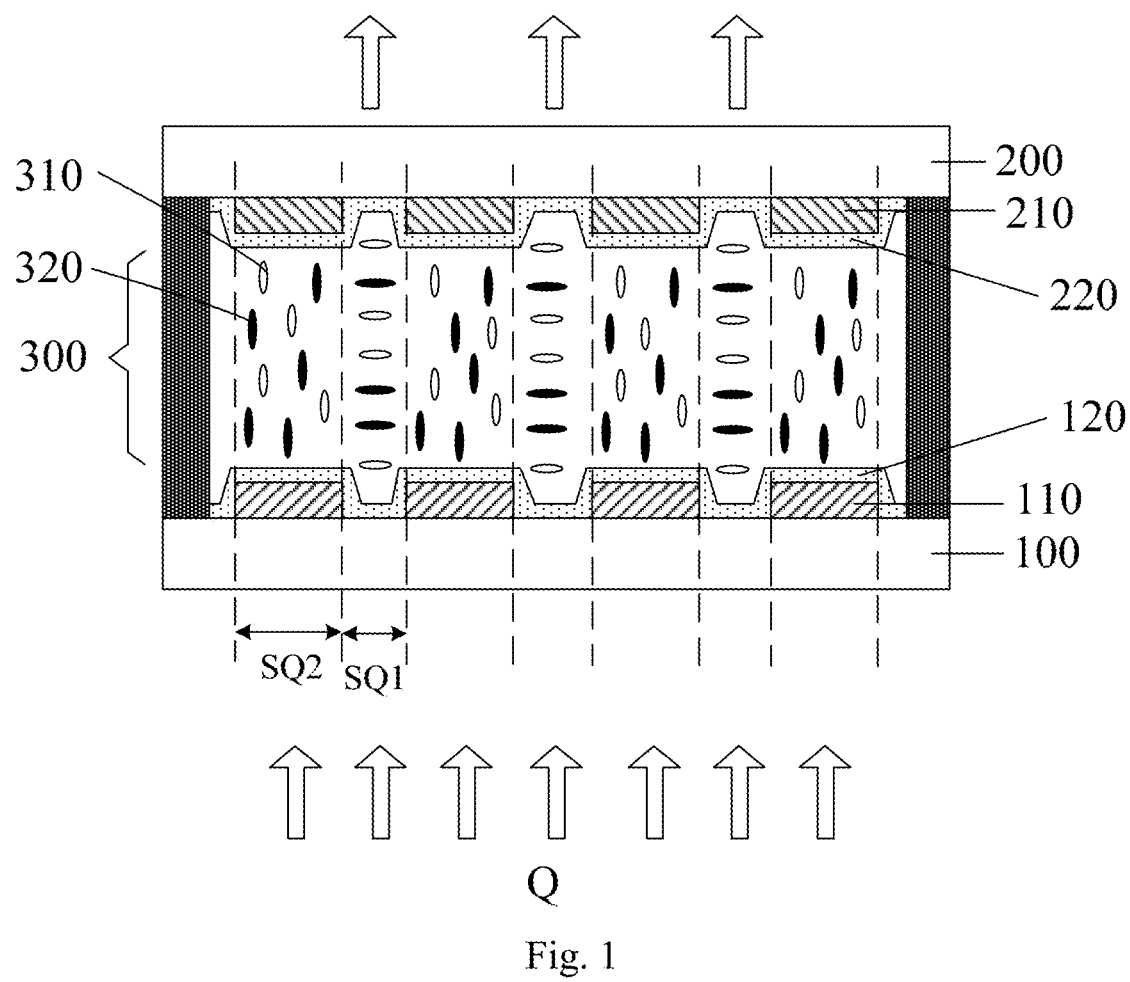
FIG. 1 is some schematic diagrams of an anti-peeping panel in an embodiment of the present disclosure.

In order to make objectives, technical solutions and advantages of embodiments of the present disclosure clearer, the technical solutions of the embodiments of the present disclosure will be clearly and completely described below with reference to the accompanying drawings of the embodiments of the present disclosure. Obviously, the described embodiments are a part of embodiments of the present disclosure, rather than all the embodiments. Under the condition that no conflict, the embodiments of the present disclosure and the features of the embodiments may be combined with each other. Based on the described embodiments of the present disclosure, all other embodiments obtained by those of ordinary skill in the art without creative efforts fall within the protection scope of the present disclosure.

Unless otherwise defined, technical or scientific terms used in the present disclosure shall have the ordinary meaning as understood by those of ordinary skill in the art to which this present disclosure belongs. "First", "second" and similar words used in the present disclosure do not represent any order, quantity, or importance, but are merely used to distinguish different components. Similar words such as "comprise" or "include" mean that elements or items appearing before the words encompass elements or items recited after the words and their equivalents, but do not exclude other elements or items. Similar words such as "connected" or "linked" are not limited to physical or mechanical connections, but may include electrical connections, whether direct or indirect.

It should be noted that dimensions and shapes of figures in the accompanying drawings do not reflect a real scale, and are only intended to illustrate the contents of the present disclosure. The same or similar reference numerals refer to the same or similar elements or elements having the same or similar functions throughout.

An embodiment of the present disclosure provides an anti-peeping panel, as shown in FIG. 1, including:

a first substrate 100;

a second substrate 200, arranged opposite to the first substrate 100;

a composite material layer 300, encapsulated between the first substrate 100 and the second substrate 200;

a first transparent electrode layer, located on a side of the first substrate 100 facing the composite material layer 300 and including a plurality of first strip-shaped electrodes 110 which are arranged at intervals; and a second transparent electrode layer, located on a side of the second substrate 200 facing the composite material layer 300 and including a plurality of second strip-shaped electrodes 210 which are arranged at intervals, wherein an orthographic projection of at least one first strip-shaped electrode 110 on the first substrate 100 and an orthographic projection of at least one second strip-shaped electrode 210 on the first substrate 100 have a first overlapping region.

The composite material layer 300 has a first composite region SQ1 and a second composite region SQ2, the second composite region SQ2 overlaps the first overlapping region, and the composite material layer in the second composite region SQ2 at least includes two different polymer network skeleton structures.

When an electric field of a first frequency exists between the first strip-shaped electrodes 110 and the second strip-shaped electrodes 210, the second composite region SQ2 shades light, and the first composite region SQ1 transmits light.

When an electric field of a second frequency exists between the first strip-shaped electrodes 110 and the second strip-shaped electrodes 210, the second composite region SQ2 transmits light, and the first composite region SQ1 transmits light.

The first frequency is different from the second frequency.

According to the above anti-peeping panel provided by the embodiment of the present disclosure, through the arrangement of the composite material layer having the first composite region and the second composite region, because the first composite region overlaps the first overlapping region, when the electric field of the first frequency exists between the first strip-shaped electrodes and the second strip-shaped electrodes, the second composite region may shade light, and the first composite region may transmit light, so an effect of anti-peeping display is realized; and when the electric field of the second frequency exists between the first strip-shaped electrodes and the second strip-shaped electrodes, the second composite region may transmit light, and the first composite region may transmit light, so an effect of shared display is realized.

In some examples, during specific implementation, as shown in FIG. 1, one of the first strip-shaped electrodes 110 may correspond to one of the second strip-shaped electrodes 210. Exemplarily, an orthographic projection of one of the first strip-shaped electrodes 110 on the first substrate 100 overlaps an orthographic projection of one of the second strip-shaped electrodes 210 on the first substrate 100.

In some examples, during specific implementation, as shown in FIG. 1, the anti-peeping panel may further include: a first alignment layer 120 located between the first transparent electrode layer and the composite material layer 300 and a second alignment layer 220) located between the second transparent electrode layer and the composite material layer 300. An orthographic projection of the first alignment layer 120 on the first substrate 100 covers the entire first substrate 100, and an orthographic projection of the second alignment layer 220 on the second substrate 200 covers the entire second substrate 200. In this way, the first alignment layer 120 and the second alignment layer 220 may perform alignment of the liquid crystal molecules 310 and the positive dichroic dye molecules 320.

In some examples, during specific implementation, materials of the first alignment layer 120 and the second alignment layer 220 may be selected from but are not limited to polyvinyl alcohol (PVA) or polyimide (PI). In practical application, the materials of the first alignment layer 120 and the second alignment layer 220 may be set according to requirements of practical application, which is not limited here.

In some examples, during specific implementation, materials of the first transparent electrode layer and the second transparent electrode layer may be selected from but are not limited to indium tin oxide (ITO), graphene or conductive polymers. In practical application, the materials of the first transparent electrode layer and the second transparent electrode layer may be set according to requirements of practical application, which is not limited here.

In some examples, during specific implementation, materials of the first substrate 100 and the second substrate 200 may be selected from but are not limited to glass substrates or polymer substrates. In practical application, the materials of the first substrate 100 and the second substrate 200 may be set according to requirements of practical application, which is not limited here.

In some examples, during specific implementation, the first frequency may be smaller than the second frequency. For example, the first frequency is a low frequency and the second frequency is a high frequency. Exemplarily, a range of the first frequency may be 20 Hz-100 Hz. For example, the first frequency may be 20 Hz, the first frequency may be 50 Hz, the first frequency may be 70 Hz, or the first frequency may be 100 Hz. In practical application, a specific numerical value of the first frequency may be set according to requirements of practical application, which is not limited here.

Exemplarily, a range of the second frequency may be 1000 Hz-10000 Hz. For example, the second frequency may be 1000 Hz, the second frequency may be 3000 Hz, the second frequency may be 5000 Hz, the second frequency may be 8000 Hz, or the second frequency may be 10000 Hz. In practical application, a specific numerical value of the second frequency may be set according to requirements of practical application, which is not limited here.

Figure 2:
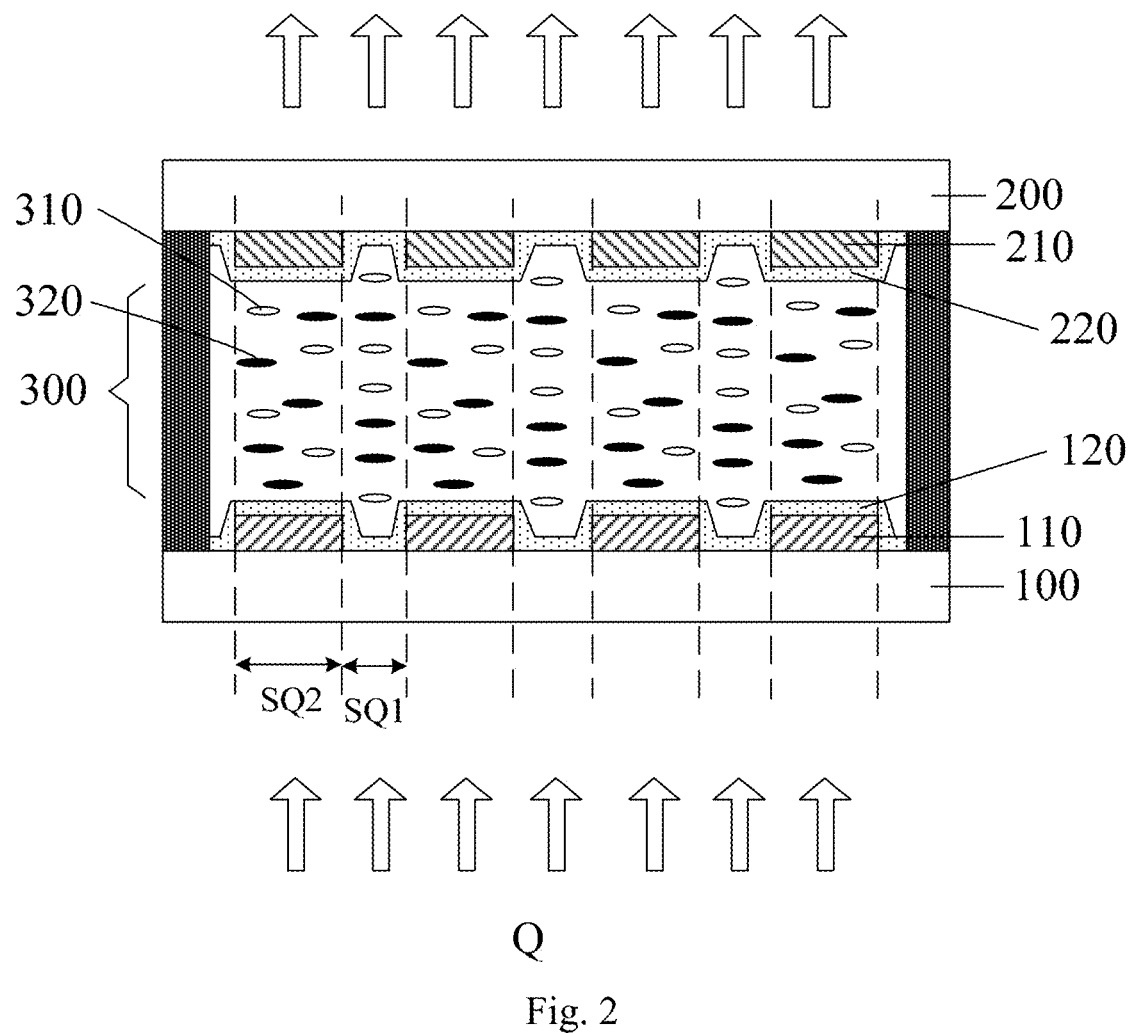
FIG. 2 is some other schematic diagrams of an anti-peeping panel in an embodiment of the present disclosure.

In some examples, during specific implementation, as shown in FIG. 1 and FIG. 2, the composite material layer 300 in the second composite region SQ2 may include: a first polymer network skeleton structure, a second polymer network skeleton structure, liquid crystal molecules 310, and positive dichroic dye molecules 320. For example, the liquid crystal molecules 310 and the positive dichroic dye molecules 320 are dispersed in the first polymer network skeleton structure and the second polymer network skeleton structure. It should be noted that. FIG. 1 and FIG. 2 merely illustrate the liquid crystal molecules 310 and the positive dichroic dye molecules 320.

In some examples, during specific implementation, as shown in FIG. 1 and FIG. 2, the composite material layer 300 in the first composite region SQ1 includes: the first polymer network skeleton structure, the liquid crystal molecules 310, and the positive dichroic dye molecules 320. For example, the liquid crystal molecules 310 and the positive dichroic dye molecules 320 are dispersed in the first polymer network skeleton structure. It should be noted that. FIG. 1 and FIG. 2 merely illustrate the liquid crystal molecules 310 and the positive dichroic dye molecules 320.

Figure 3A:
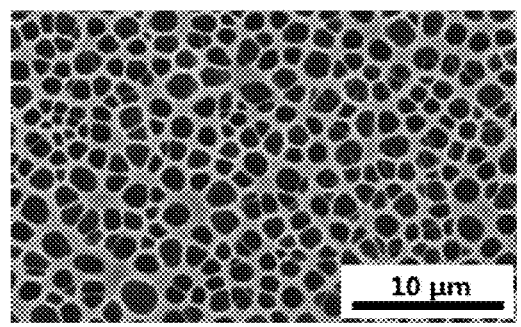
FIG. 3A is a top-view diagram of a polymer cross-linked network skeleton structure in an embodiment of the present disclosure.
Figure 3B:
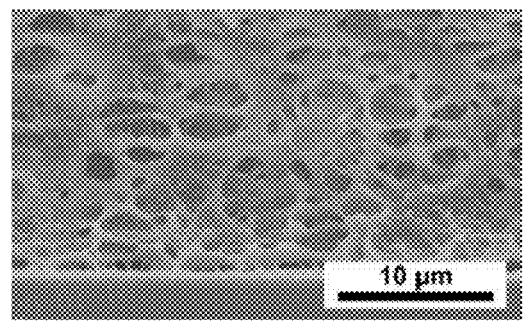
FIG. 3B is a sectional diagram of a polymer cross-linked network skeleton structure in an embodiment of the present disclosure.
Figure 4:
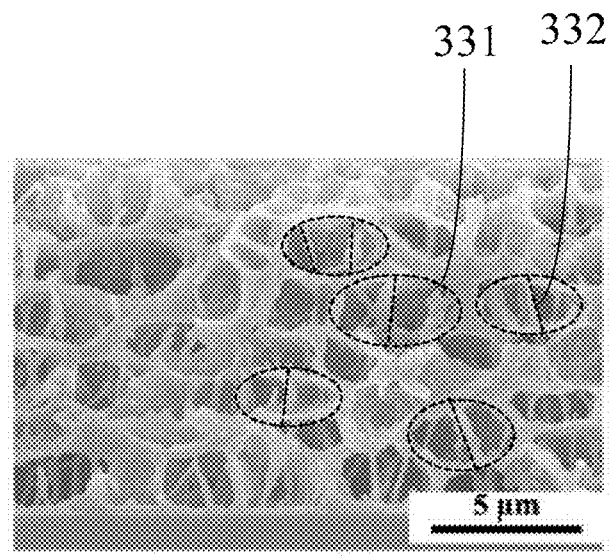
FIG. 4 is a sectional diagram of a polymer cross-linked network skeleton structure and a polymer perpendicular network skeleton structure in an embodiment of the present disclosure.

Exemplarily, the first polymer network skeleton structure may be a polymer cross-linked network skeleton structure. Examples of the polymer cross-linked network skeleton structure are shown in FIG. 3A. FIG. 3B and FIG. 4. Among them. FIG. 3A illustrates a top-view diagram of the polymer cross-linked network skeleton structure. FIG. 3B illustrates a sectional diagram of the polymer cross-linked network skeleton structure, and FIG. 4 illustrates a sectional diagram of a polymer cross-linked network skeleton structure 331 and a polymer perpendicular network skeleton structure 332. In preparation, polymerizable monomers may be adopted to form the polymer cross-linked network skeleton structure. The polymerizable monomers may be selected from but are not limited to unsaturated polyesters, acrylates, vinyl ethers, and the like. In practical application, specific implementation of the polymerizable monomers may be set according to requirements of practical application, which is not limited here.

Exemplarily, the second polymer network skeleton structure may be a polymer perpendicular network skeleton structure. An example of the polymer perpendicular network skeleton structure is shown in FIG. 4. FIG. 4 illustrates a sectional diagram of a polymer cross-linked network skeleton structure 331 and a polymer perpendicular network skeleton structure 332. In preparation, polymerizable monomers may be adopted to form the polymer perpendicular network skeleton structure. The polymerizable monomers may be selected from but are not limited to unsaturated polyesters, acrylates, vinyl ethers, and the like. In practical application, specific implementation of the polymerizable monomers may be set according to requirements of practical application, which is not limited here.

Exemplarily, the liquid crystal molecules 310 may have dual-frequency characteristics. For example, the liquid crystal molecules 310 may be selected from but are not limited to nematic liquid crystal molecules 310, smectic liquid crystal molecules 310 or cholesteric liquid crystal molecules 310. In practical application, specific implementation of the liquid crystal molecules 310 may be set according to requirements of practical application, which is not limited here.

Exemplarily, a dichroic ratio of a positive dichroic dye may be not less than 5. For example, the dichroic ratio of the positive dichroic dye may be 5, 6, or other numerical values, which is not limited here.

Exemplarily, the positive dichroic dye molecules 320 may be positive dichroic black dye molecules, or positive dichroic red dye molecules, or a mixture of positive dichroic yellow dye molecules and positive dichroic blue dye molecules. In practical application, specific implementation of the positive dichroic dye molecules 320 may be set according to requirements of practical application, which is not limited here.

In some examples, during specific implementation, as shown in FIG. 1, the liquid crystal molecules 310 and the positive dichroic dye molecules 320 in the first composite region SQ1 are respectively arranged parallel to the first substrate 100. Exemplarily, when the liquid crystal molecules 310 and the positive dichroic dye molecules 320 are respectively arranged parallel to the first substrate 100, absorption of incident light Q by the composite material layer 300 in the first composite region SQ1 is relatively weak, so a light transmitting effect may be realized.

In some examples, during specific implementation, as shown in FIG. 1, when the second composite region SQ2 shades light, the liquid crystal molecules 310 and the positive dichroic dye molecules 320 in the second composite region SQ2 are respectively arranged perpendicular to the first substrate 100. Exemplarily, when the liquid crystal molecules 310 and the positive dichroic dye molecules 320 are respectively arranged perpendicular to the first substrate 100, absorption of the incident light Q by the composite material layer 300 in the second composite region SQ2 is relatively strong, so a light shading effect may be realized.

In some examples, during specific implementation, as shown in FIG. 2, when the second composite region SQ2 transmits light, the liquid crystal molecules 310 and the positive dichroic dye molecules 320 in the second composite region SQ2 are respectively arranged parallel to the first substrate 100. Exemplarily, when the liquid crystal molecules 310 and the positive dichroic dye molecules 320 are respectively arranged parallel to the first substrate 100, absorption of the incident light Q by the composite material layer 300 in the second composite region SQ2 is relatively weak, so a light transmitting effect may be realized.

Figure 5:
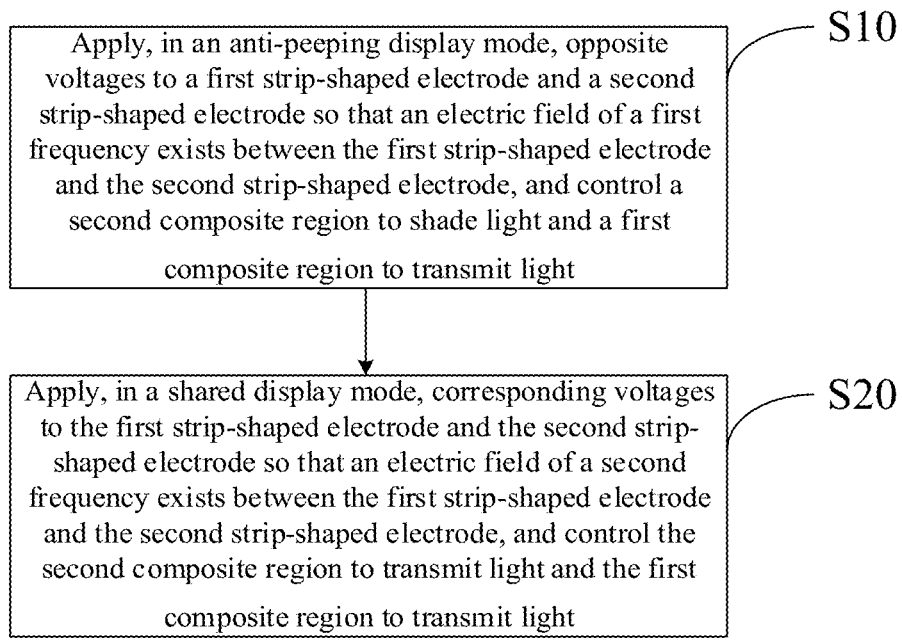
FIG. 5 is a flow chart of a driving method in an embodiment of the present disclosure.

In some examples, as shown in FIG. 5, an embodiment of the present disclosure further provides a driving method of an anti-peeping panel. The method may include the following steps.

S10, in an anti-peeping display mode, opposite voltages is applied to a first strip-shaped electrode and a second strip-shaped electrode so that an electric field of a first frequency exists between the first strip-shaped electrode and the second strip-shaped electrode, a second composite region is controlled to shade light and a first composite region is controlled to transmit light.

S20, in a shared display mode, corresponding voltages is applied to the first strip-shaped electrode and the second strip-shaped electrode so that an electric field of a second frequency exists between the first strip-shaped electrode and the second strip-shaped electrode, the second composite region is controlled to transmit light and the first composite region is controlled to transmit light.

It should be noted that, step S10 may be performed before step S20, or step S10 may be performed after step S20, which is not limited here.

The driving method provided by embodiments of the present disclosure will be described below in combination with FIG. 1 and FIG. 2 taking the first frequency being a low frequency as an example and in combination with specific embodiments. According to the driving method of the above anti-peeping panel provided by the embodiment of the present disclosure, in the shared display mode, liquid crystal molecules 310 and positive dichroic dye molecules 320 in the first composite region SQ1 and the second composite region SQ2 of the composite material layer 300 are both arranged parallel to the first substrate 100, i.e. horizontally arranged. When the liquid crystal molecules 310 and the positive dichroic dye molecules 320 are both horizontally arranged, absorption of incident light Q is relatively weak, so the first composite region SQ1 and the second composite region SQ2 may both realize the light transmitting effect.

When the shared display mode is switched to the anti-peeping display mode, the opposite voltages are applied to the first strip-shaped electrode 110 and the second strip-shaped electrode 210, a low-frequency electric field may be formed between the first strip-shaped electrode 110 and the second strip-shaped electrode 210, and an electric field force formed by the low-frequency electric field will be larger than an orientation force between a first orientation layer and a second orientation layer, so that the liquid crystal molecules 310 in the second composite region SQ2 in the composite material layer 300 switch from being parallel to the first substrate 100 to being perpendicular to the first substrate 100 with an effect of the low-frequency electric field and at the same time the positive dichroic dye molecules 320 are driven to switch from being parallel to the first substrate 100 to being perpendicular to the first substrate 100. When the liquid crystal molecules 310 and the positive dichroic dye molecules 320 are both perpendicularly arranged, absorption of the incident light Q is relatively strong, so the second composite region SQ2 may realize the light shading effect. The first composite region SQ1 is not affected by the low-frequency electric field, and the liquid crystal molecules 310 and the positive dichroic dye molecules 320 in the first composite region SQ1 are both parallel to the first substrate 100, so that the first composite region SQ1 realizes the light transmitting effect. Therefore, through the condition that the second composite region SQ2 realizes the light shading effect and the first composite region SQ1 realizes the light transmitting effect, the anti-peeping panel may realize the anti-peeping display effect.

Furthermore, after stopping applying voltages to the first strip-shaped electrode 110 and the second strip-shaped electrode 210, i.e. the low-frequency electric field is removed, the liquid crystal molecules 310 and the positive dichroic dye molecules 320 that have been arranged perpendicular to the first substrate 100 may continue to be arranged perpendicularly under an anchoring effect of a polymer perpendicular network skeleton structure, and the anti-peeping display effect is further realized. In this way, in the anti-peeping display mode, energy consumption of the anti-peeping panel may be reduced.

The driving method provided by the embodiment of the present disclosure will be described below in combination with FIG. 1 and FIG. 2 taking the second frequency being a high frequency as an example and in combination with specific embodiments. According to the driving method of the above anti-peeping panel provided by the embodiment of the present disclosure, in the anti-peeping display mode, the liquid crystal molecules 310 and the positive dichroic dye molecules 320 in the first composite region SQ1 of the composite material layer 300 are both arranged parallel to the first substrate 100. The liquid crystal molecules 310 and the positive dichroic dye molecules 320 in the second composite region SQ2 of the composite material layer 300 are both arranged perpendicular to the first substrate 100.

When the anti-peeping display mode is switched to the shared display mode, opposite voltages are applied to the first strip-shaped electrode 110 and the second strip-shaped electrode 210, a high-frequency electric field may be formed between the first strip-shaped electrode 110 and the second strip-shaped electrode 210, an electric field force formed by the high-frequency electric field will be larger than an anchoring force of the polymer perpendicular network skeleton structure, and the orientation force exists between the first orientation layer and the second orientation layer, so that the liquid crystal molecules 310 in the second composite region SQ2 in the composite material layer 300 switch from being arranged perpendicularly to being arranged horizontally and at the same time the positive dichroic dye molecules 320 are driven to switch to being arranged horizontally. When the liquid crystal molecules 310 and the positive dichroic dye molecules 320 in the second composite region SQ2 are both horizontally arranged, absorption of the incident light Q is relatively weak, so the second composite region SQ2 may realize the light transmitting effect. The first composite region SQ1 is not affected by the high-frequency electric field and the liquid crystal molecules 310 and the positive dichroic dye molecules 320 in the first composite region SQ1 are both parallel to the first substrate 100, so that the first composite region SQ1 realizes the light transmitting effect. Therefore, through the condition that the second composite region SQ2 realizes the light transmitting effect and the first composite region SQ1 realizes the light transmitting effect, the anti-peeping panel may realize the shared display effect.

Furthermore, after stopping applying voltages to the first strip-shaped electrode 110 and the second strip-shaped electrode 210, i.e. the high-frequency electric field is removed, the liquid crystal molecules 310 and the positive dichroic dye molecules 320 in the first composite region SQ1 and the second composite region SQ2 that have been arranged horizontally may continue to be arranged horizontally under an orientation effect between the first orientation layer and the second orientation layer. In this way, in the shared display mode, energy consumption of the anti-peeping panel may be reduced.

In conclusion, according the above anti-peeping panel provided by the embodiment of the present disclosure, by forming the low-frequency electric field and the high-frequency electric field between the first strip-shaped electrode 110 and the second strip-shaped electrode 210, the second composite region SQ2 may switch between a strong light absorption state to a weak light absorption state, thus realizing switch between the anti-peeping display mode and the shared display mode. In addition, the strong light absorption state and the weak light absorption state can be maintained as well when no low-frequency electric field or the high-frequency electric field is formed, so energy consumption of the anti-peeping panel may be reduced.

Figure 11:
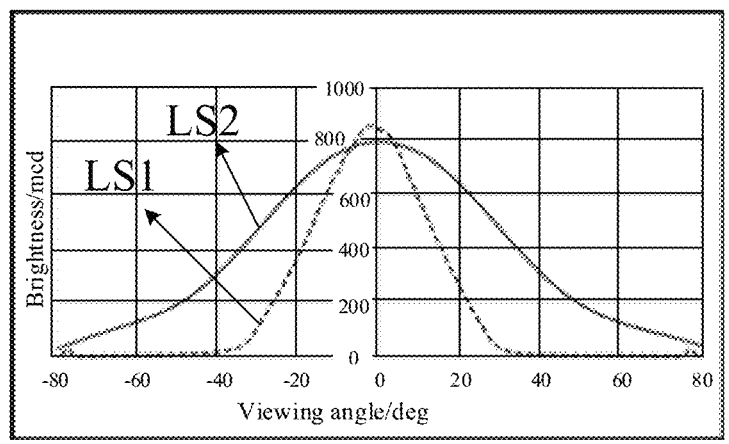
FIG. 11 is viewing angle-brightness curves of an anti-peeping panel working in a low-frequency electric field and a high-frequency electric field in an embodiment of the present disclosure.

In addition, as shown in FIG. 11, viewing angle-brightness curves of an anti-peeping panel working in a low-frequency electric field and a high-frequency electric field is illustrated. A curve LS1 represents the viewing angle-brightness curve of the anti-peeping panel working in the low-frequency electric field, and a curve LS2 represents the viewing angle-brightness curve of the anti-peeping panel working in the high-frequency electric field. It can be seen from FIG. 11 that the anti-peeping panel may realize a narrow viewing angle when working in the low-frequency electric field, and the anti-peeping panel may realize a wide viewing angle when working in the high-frequency electric field.

Figure 6:
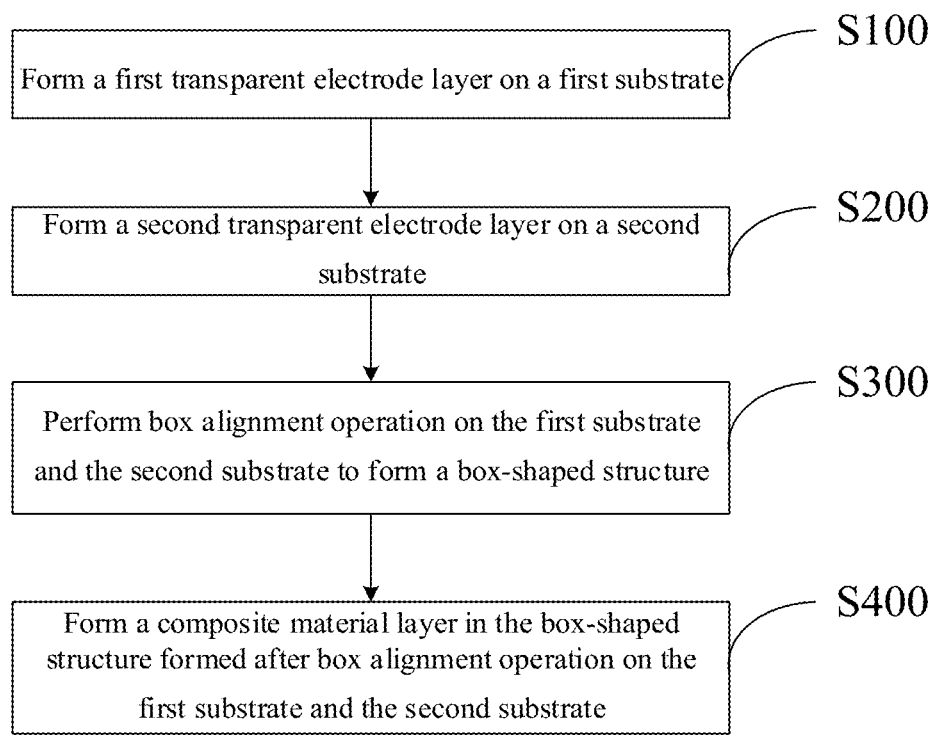
FIG. 6 is some flow charts of a preparation method in an embodiment of the present disclosure.

In some examples, as shown in FIG. 6, an embodiment of the present disclosure further provides a preparation method of an anti-peeping panel. The method may include the following steps.

S100, a first transparent electrode layer is formed on a first substrate, wherein the first transparent electrode layer includes a plurality of first strip-shaped electrodes which are arranged at intervals.

S200, a second transparent electrode layer is formed on a second substrate, wherein the second transparent electrode layer includes a plurality of second strip-shaped electrodes which are arranged at intervals, and an orthographic projection of at least one first strip-shaped electrode on the first substrate and an orthographic projection of at least one second strip-shaped electrode on the first substrate have a first overlapping region.

S300, box alignment operation is performed on the first substrate and the second substrate to form a box-shaped structure.

S400, a composite material layer is formed in the box-shaped structure formed after box alignment operation on the first substrate and the second substrate, wherein the composite material layer has a first composite region and a second composite region, the second composite region overlaps the first overlapping region, and the composite material layer in the second composite region at least includes two different polymer network skeleton structures: when an electric field of a first frequency is applied between the first strip-shaped electrodes and the second strip-shaped electrodes, the second composite region shades light, and the first composite region transmits light; and when an electric field of a second frequency is applied between the first strip-shaped electrodes and the second strip-shaped electrodes, the second composite region transmits light, and the first composite region transmits light; and the first frequency is different from the second frequency.

It should be noted that, step S100 may be carried out simultaneously with step S200, or step S100 may be performed before step S200, or step S100 may be performed after step S200, which is not limited here.

Figure 7:
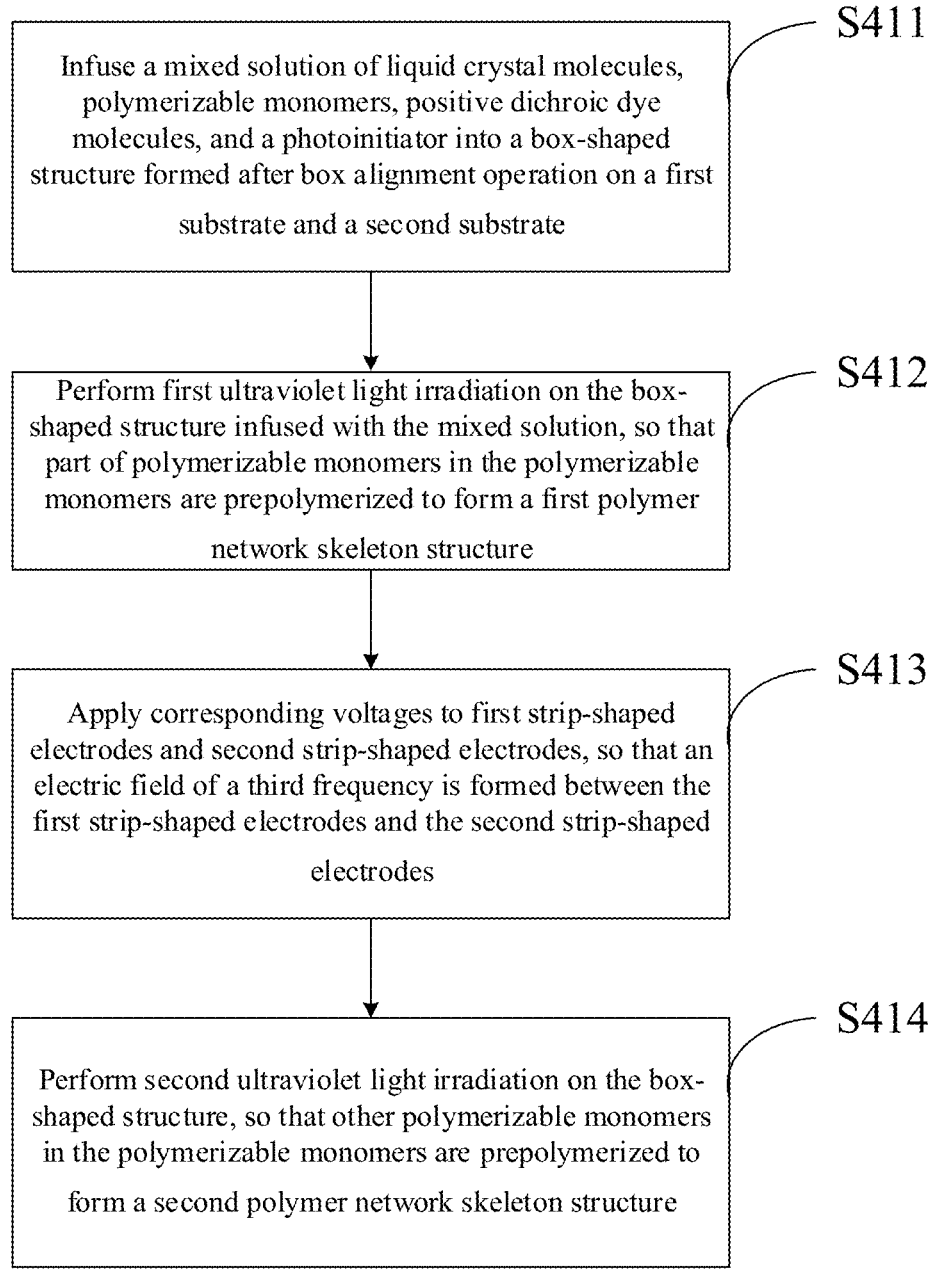
FIG. 7 is some other flow charts of a preparation method in an embodiment of the present disclosure.

In some examples, during specific implementation, as shown in FIG. 7, when the first frequency is smaller than the second frequency, step S400: the composite material layer 300 is formed in the box-shaped structure formed after box alignment operation on the first substrate 100 and the second substrate 200, may specifically include:

S411, a mixed solution of liquid crystal molecules, polymerizable monomers, positive dichroic dye molecules, and a photoinitiator is infused into the box-shaped structure formed after box alignment operation on the first substrate and the second substrate;

S412, a first ultraviolet light irradiation is performed on the box-shaped structure infused with the mixed solution, so that part of polymerizable monomers are prepolymerized to form a first polymer network skeleton structure;

S413, corresponding voltages are applied to the first strip-shaped electrodes and the second strip-shaped electrodes, so that an electric field of a third frequency is formed between the first strip-shaped electrodes and the second strip-shaped electrodes; and S414, a second ultraviolet light irradiation is performed on the box-shaped structure, so that other polymerizable monomers in the polymerizable monomers are prepolymerized to form a second polymer network skeleton structure.

In some examples, during specific implementation, the third frequency may be smaller than the second frequency. For example, the third frequency is a low frequency. Exemplarily, a range of the third frequency may be 20 Hz-100 Hz. For example, the third frequency may be 20 Hz, the third frequency may be 50 Hz, the third frequency may be 70 Hz, or the third frequency may be 100 Hz. In practical application, a specific numerical value of the third frequency may be set according to requirements of practical application, which is not limited here.

The preparation method provided by the embodiment of the present disclosure will be described below in combination with FIG. 1 and FIG. 2 taking the liquid crystal molecules 310 being nematic liquid crystal molecules 310 and the third frequency being the low frequency as an example and in combination with specific embodiments. The preparation method of the above anti-peeping panel provided by the embodiment of the present disclosure may include the following steps.

(1) The first transparent electrode layer and a first alignment layer 120 are sequentially formed on the first substrate 100.

(2) The second transparent electrode layer and a second alignment layer 220 are sequentially formed on the second substrate 200.

(3) Box alignment operation is performed on the first substrate 100 and the second substrate 200, and encapsulation is performed using a sealant to form the box-shaped structure.

(4) The nematic liquid crystal molecules 310, the polymerizable monomers, the positive dichroic dye molecules 320, and the photoinitiator are mixed to obtain a uniform mixture, and then the mixture is infused into the box-shaped structure formed by the first substrate 100 and the second substrate 200. At the moment, the infused nematic liquid crystal molecules 310 and positive dichroic dye molecules 320 are arranged to be parallel to the first substrate 100 under an orientation effect between the first orientation layer 120 and the second orientation layer 220, i.e. arranged horizontally.

(5) First ultraviolet light irradiation is performed on the box-shaped structure infused with the mixed solution, so that part of the polymerizable monomers in the mixed solution is induced by the first ultraviolet light irradiation to be prepolymerized to form a polymer cross-linked network skeleton structure. In this way, the polymer cross-linked network skeleton structure may be formed in an entire region of the box-shaped structure.

(6) The corresponding voltages are applied to the first strip-shaped electrodes 110 and the second strip-shaped electrodes 210, so that the low-frequency electric field is formed between the first strip-shaped electrodes 110 on the first substrate 100 and the second strip-shaped electrodes 210 on the second substrate 200, the liquid crystal molecules 310 are oriented with the electric field, and the positive dichroic dye molecules 320 are driven to be oriented accordingly.

(7) Second ultraviolet light irradiation is performed on the box-shaped structure, so that other polymerizable monomers in the polymerizable monomers are induced by the second ultraviolet light irradiation to be prepolymerized to form a polymer perpendicular network skeleton structure. In this way, the polymer cross-linked network skeleton structure and the polymer perpendicular network skeleton structure may be formed in a region where the first strip-shaped electrodes 110 are opposite to the second strip-shaped electrodes 210 without changing the polymer cross-linked network skeleton structure in a remaining region. Therefore, the polymer cross-linked network skeleton structure is formed in the first composite region SQ1 of the composite material layer 300, and the polymer cross-linked network skeleton structure and the polymer perpendicular network skeleton structure are formed in the second composite region SQ2 of the composite material layer 300.

It should be noted that, after the low-frequency electric field is removed, the polymer perpendicular network skeleton structure may anchor the liquid crystal molecules 310 and the positive dichroic dye molecules 320 to continue to be arranged perpendicular to the first substrate 100.

Figure 8:
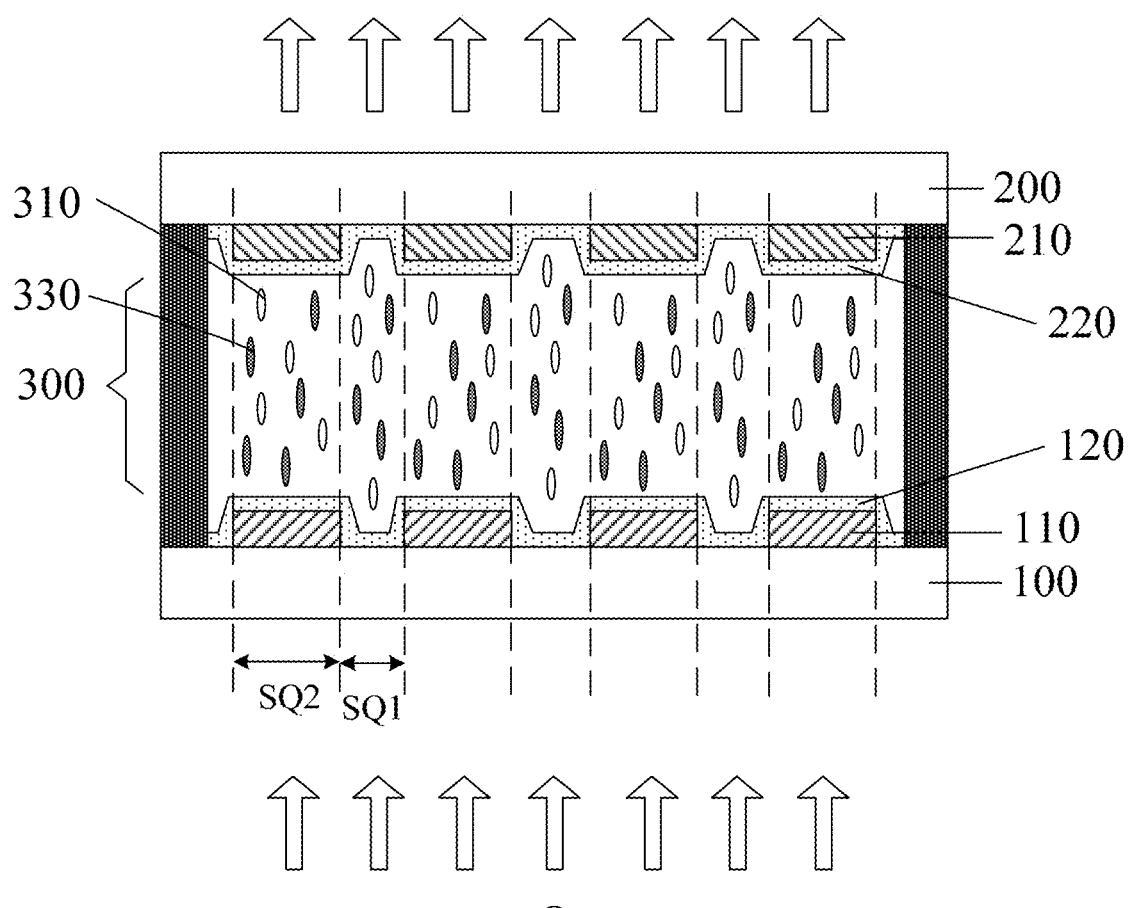
FIG. 8 is further other schematic diagrams of an anti-peeping panel in an embodiment of the present disclosure.
Figure 9:
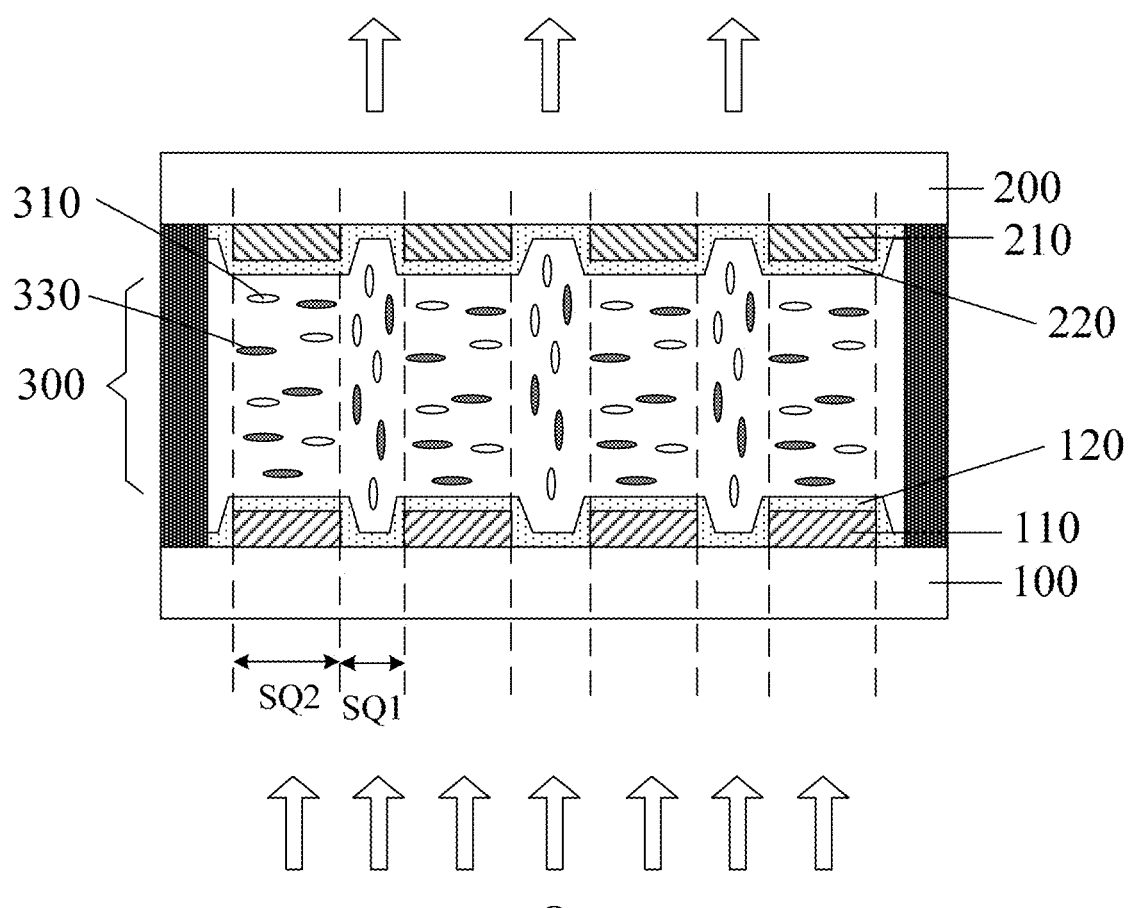
FIG. 9 is further other schematic diagrams of an anti-peeping panel in an embodiment of the present disclosure.

An embodiment of the present disclosure provides further other anti-peeping panels. Schematic structural diagrams thereof are shown in FIG. 8 and FIG. 9, and modification is made on the implementations in the above embodiments. Only differences between this embodiment and the above embodiments are described below; and similar descriptions are not repeated here.

In some examples, during specific implementation, as shown in FIG. 8 and FIG. 9, the first frequency may be larger than the second frequency. For example, the first frequency is a high frequency and the second frequency is a low frequency. Exemplarily, a range of the first frequency may be 1000 Hz-10000 Hz. For example, the first frequency may be 1000 Hz, the first frequency may be 3000 Hz, the first frequency may be 5000 Hz, the first frequency may be 8000 Hz, or the first frequency may be 10000 Hz. In practical application, a specific numerical value of the first frequency may be set according to requirements of practical application, which is not limited here.

Exemplarily, a range of the second frequency may be 20 Hz-100 Hz. For example, the second frequency may be 20 Hz, the second frequency may be 50 Hz, the second frequency may be 70 Hz, or the second frequency may be 100 Hz. In practical application, a specific numerical value of the second frequency may be set according to requirements of practical application, which is not limited here.

In some examples, during specific implementation, as shown in FIG. 8 and FIG. 9, the composite material layer 300 in the second composite region SQ2 and the first composite region SQ1 may include: a first polymer network skeleton structure, a second polymer network skeleton structure, liquid crystal molecules 310, and negative dichroic dye molecules. Exemplarily, a dichroic ratio of the negative dichroic dye molecules may be not larger than −5. For example, the dichroic ratio of the negative dichroic dye molecules may be −5, −4, or other numerical values, which is not limited here.

Exemplarily, the negative dichroic dye molecules may be selected from but are not limited to: negative dichroic black dye molecules, or a mixture of negative dichroic red dye molecules, negative dichroic yellow dye molecules and negative dichroic blue dye molecules. In practical application, specific implementation of the negative dichroic dye molecules may be set according to requirements of practical application, which is not limited here.

In some examples, during specific implementation, as shown in FIG. 8 and FIG. 9, the liquid crystal molecules 310 and the negative dichroic dye molecules 330 in the first composite region SQ1 are respectively arranged perpendicular to the first substrate 100. Exemplarily, when the liquid crystal molecules 310 and the negative dichroic dye molecules 330 are respectively arranged perpendicular to the first substrate 100, absorption of incident light Q by the composite material layer 300 in the first composite region SQ1 is relatively weak, so a light transmitting effect may be realized.

In some examples, during specific implementation, as shown in FIG. 8 and FIG. 9, when the second composite region SQ2 transmits light, the liquid crystal molecules 310 and the negative dichroic dye molecules 330 in the second composite region SQ2 are respectively arranged perpendicular to the first substrate 100. Exemplarily, when the liquid crystal molecules 310 and the negative dichroic dye molecules 330 are respectively arranged perpendicular to the first substrate 100, absorption of the incident light Q by the composite material layer 300 in the second composite region SQ2 is relatively weak, so a light transmitting effect may be realized.

In some examples, during specific implementation, as shown in FIG. 8 and FIG. 9, when the second composite region SQ2 shades light, the liquid crystal molecules 310 and the negative dichroic dye molecules 330 in the second composite region SQ2 are respectively arranged parallel to the first substrate 100. Exemplarily, when the liquid crystal molecules 310 and the negative dichroic dye molecules 330 are respectively arranged parallel to the first substrate 100, absorption of the incident light Q by the composite material layer 300 in the second composite region SQ2 is relatively strong, so a light shading effect may be realized.

In some examples, during specific implementation, as shown in FIG. 8 and FIG. 9, the anti-peeping panel may further include: a third transparent electrode layer located between the first substrate 100 and the first transparent electrode layer, a first insulating layer located between the third transparent electrode layer and the first transparent electrode layer, a fourth transparent electrode layer located between the second substrate 200 and the second transparent electrode layer, and second insulating layer located between the fourth transparent electrode layer and the second transparent electrode layer. An orthographic projection of the third transparent electrode layer on the first substrate 100 and gaps between orthographic projections of the first strip-shaped electrodes 110 on the first substrate 100 have overlapping regions; and an orthographic projection of the fourth transparent electrode layer on the second substrate 200 and gaps between orthographic projections of the second strip-shaped electrodes 210 on the second substrate 200 have overlapping regions. Further, the orthographic projection of the third transparent electrode layer on the first substrate 100 covers the first substrate 100. The orthographic projection of the fourth transparent electrode layer on the second substrate 200 covers the second substrate 200.

In some examples, during specific implementation, materials of the third transparent electrode layer and the fourth transparent electrode layer may be selected from but are not limited to indium tin oxide (ITO), graphene or conductive polymers. In practical application, the materials of the third transparent electrode layer and the fourth transparent electrode layer may be set according to requirements of practical application, which is not limited here.

The driving method provided by embodiments of the present disclosure will be described below in combination with FIG. 8 and FIG. 9 taking the first frequency being the high frequency as an example and in combination with specific embodiments. According to the driving method of the above anti-peeping panel provided by embodiments of the present disclosure, in the shared display mode, the liquid crystal molecules 310 and the negative dichroic dye molecules 330 in the first composite region SQ1 and the second composite region SQ2 of the composite material layer 300 are both arranged perpendicular to the first substrate 100, i.e. perpendicularly arranged. When the liquid crystal molecules 310 and the negative dichroic dye molecules 330 are both perpendicularly arranged, absorption of the incident light Q is relatively weak, so the first composite region SQ1 and the second composite region SQ2 may both realize the light transmitting effect.

When the shared display mode is switched to the anti-peeping display mode, opposite voltages are applied to the first strip-shaped electrode 110 and the second strip-shaped electrode 210, a high-frequency electric field may be formed between the first strip-shaped electrode 110 and the second strip-shaped electrode 210, an electric field force formed by the high-frequency electric field will be larger than an anchoring force of the polymer perpendicular network skeleton structure, and the orientation force exists between the first orientation layer and the second orientation layer, so that the liquid crystal molecules 310 in the second composite region SQ2 in the composite material layer 300 switch from being arranged perpendicular to the first substrate 100 to being arranged parallel to the first substrate 100 and at the same time the negative dichroic dye molecules 330 are driven to switch from being arranged perpendicular to the first substrate 100 to being arranged parallel to the first substrate 100. When the liquid crystal molecules 310 and the negative dichroic dye molecules 330 are both arranged in parallel, absorption of the incident light Q is relatively strong, so the second composite region SQ2 may realize the light shading effect. The first composite region SQ1 is not affected by the high-frequency and electric field the liquid crystal molecules 310 and the negative dichroic dye molecules 330 in the first composite region SQ1 are both perpendicular to the first substrate 100, so that the first composite region SQ1 realizes the light transmitting effect. Therefore, through the condition that the second composite region SQ2 realizes the light shading effect and the first composite region SQ1 realizes the light transmitting effect, the anti-peeping panel may realize the anti-peeping display effect.

Furthermore, after stopping applying voltages to the first strip-shaped electrode 110 and the second strip-shaped electrode 210, i.e. the high-frequency electric field is removed, the liquid crystal molecules 310 and the negative dichroic dye molecules 330 that have been arranged in parallel to the first substrate 100 may continue to be arranged horizontally under an orientation effect between the first orientation layer and the second orientation layer, thus continuing to realize the anti-peeping display effect. In this way, in the anti-peeping display mode, energy consumption of the anti-peeping panel may be reduced.

The driving method provided by embodiments of the present disclosure will be described below in combination with FIG. 8 and FIG. 9 taking the second frequency being the low frequency as an example and in combination with specific embodiments. According to the driving method of the above anti-peeping panel provided by the embodiment of the present disclosure, in the anti-peeping display mode, the liquid crystal molecules 310 and the negative dichroic dye molecules 330 in the first composite region SQ1 of the composite material layer 300 are both arranged perpendicular to the first substrate 100. The liquid crystal molecules 310 and the negative dichroic dye molecules 330 in the second composite region SQ2 of the composite material layer 300 are both arranged in parallel to the first substrate 100.

When the anti-peeping display mode is switched to the shared display mode, opposite voltages are applied to the first strip-shaped electrode 110 and the second strip-shaped electrode 210, a low-frequency electric field may be formed between the first strip-shaped electrode 110 and the second strip-shaped electrode 210, and an electric field force formed by the low-frequency electric field will be larger than the orientation force between the first orientation layer and the second orientation layer, so that the liquid crystal molecules 310 in the second composite region SQ2 of the composite material layer 300 switch from being arranged in parallel to being arranged perpendicularly and at the same time the negative dichroic dye molecules 330 are driven to switch to being arranged perpendicularly. When the liquid crystal molecules 310 and the negative dichroic dye molecules 330 in the second composite region SQ2 are both perpendicularly arranged, absorption of the incident light Q is relatively weak, so the second composite region SQ2 may realize the light transmitting effect. The first composite region SQ1 is not affected by the high-frequency electric field and the liquid crystal molecules 310 and the negative dichroic dye molecules 330 in the first composite region SQ1 are both perpendicular to the first substrate 100, so that the first composite region SQ1 realizes the light transmitting effect. Therefore, through the condition that the second composite region SQ2 realizes the light transmitting effect and the first composite region SQ1 realizes the light transmitting effect, the anti-peeping panel may realize the shared display effect.

Furthermore, after stopping applying voltages to the first strip-shaped electrode 110 and the second strip-shaped electrode 210, i.e. the low-frequency electric field is removed, the liquid crystal molecules 310 and the negative dichroic dye molecules 330 that have been arranged perpendicular in the first composite region SQ1 and the second composite region SQ2 may continue to be arranged perpendicularly under an anchoring effect of a polymer perpendicular network skeleton structure. In this way, in the shared display mode, energy consumption of the anti-peeping panel may be reduced.

In conclusion, according the above anti-peeping panel provided by the embodiment of the present disclosure, by forming the low-frequency electric field and the high-frequency electric field between the first strip-shaped electrode 110 and the second strip-shaped electrode 210, the second composite region SQ2 may switch between a strong light absorption state to a weak light absorption state, thus realizing switch between the anti-peeping display mode and the shared display mode. In addition, the strong light absorption state and the weak light absorption state can be maintained as well when no low-frequency electric field or the high-frequency electric field is formed, so energy consumption of the anti-peeping panel may be reduced.

Figure 10:
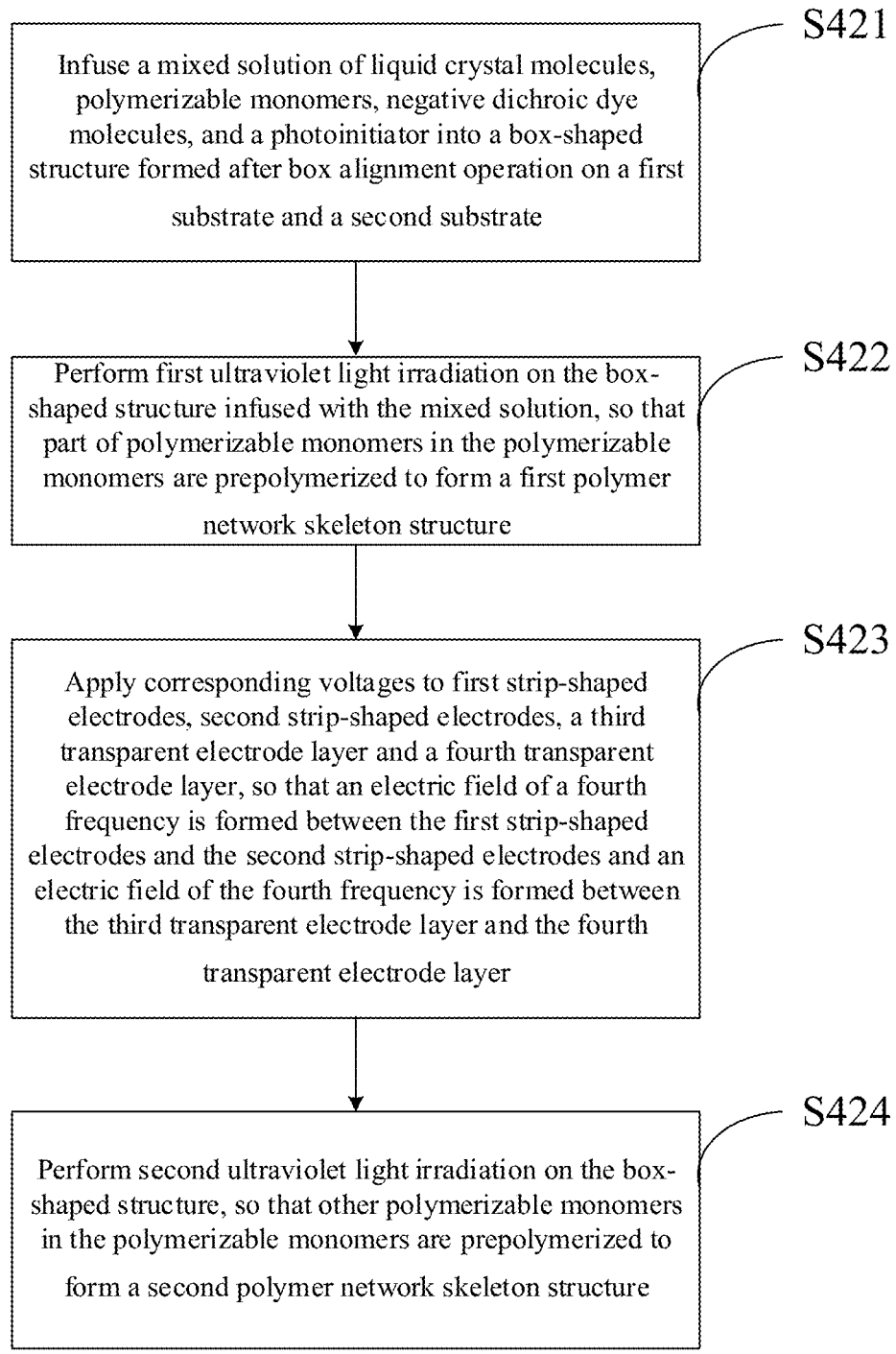
FIG. 10 is further other flow charts of a preparation method in an embodiment of the present disclosure.

In some embodiments, as shown in FIG. 10, when the first frequency is larger than the second frequency, step S400: the composite material layer 300 is formed in the box-shaped structure formed after box alignment operation on the first substrate 100 and the second substrate 200, may specifically include:

S421, a mixed solution of liquid crystal molecules, polymerizable monomers, the negative dichroic dye molecules, and a photoinitiator is infused into the box-shaped structure formed after box alignment operation on the first substrate and the second substrate;

S422, first ultraviolet light irradiation is performed on the box-shaped structure infused with the mixed solution, so that part of polymerizable monomers in the polymerizable monomers are prepolymerized to form a first polymer network skeleton structure;

S423, corresponding voltages are applied to the first strip-shaped electrodes, the second strip-shaped electrodes, the third transparent electrode layer and the fourth transparent electrode layer, so that an electric field of a third frequency is formed between the first strip-shaped electrodes and the second strip-shaped electrodes and an electric field of a third frequency is formed between the third transparent electrode layer and the fourth transparent electrode layer; and S424, second ultraviolet light irradiation is performed on the box-shaped structure, so that other polymerizable monomers in the polymerizable monomers are prepolymerized to form a second polymer network skeleton structure.

In some examples, during specific implementation, the fourth frequency may be smaller than the second frequency. For example, the fourth frequency is a low frequency. Exemplarily, a range of the fourth frequency may be 20 Hz-100 Hz. For example, the fourth frequency may be 20 Hz, the fourth frequency may be 50 Hz, the fourth frequency may be 70 Hz. or the fourth frequency may be 100 Hz. In practical application, a specific numerical value of the fourth frequency may be set according to requirements of practical application, which is not limited here.

The preparation method provided by the embodiment of the present disclosure will be described below taking the liquid crystal molecules 310 being nematic liquid crystal molecules 310 and the fourth frequency being the low frequency as an example and in combination with specific embodiments. The preparation method of the above anti-peeping panel provided by the embodiment of the present disclosure may include the following steps.

(1) The first transparent electrode layer, a first insulating layer, the third transparent electrode layer and a first alignment layer 120 are sequentially formed on the first substrate 100.

(2) The second transparent electrode layer, a second insulating layer, the fourth transparent electrode layer and a second alignment layer 220 are sequentially formed on the second substrate 200.

(3) Box alignment operation is performed on the first substrate 100 and the second substrate 200, and encapsulation is performed using a sealant to form the box-shaped structure.

(4) The nematic liquid crystal molecules 310, the polymerizable monomers, the negative dichroic dye molecules 330, and the photoinitiator are mixed to obtain a uniform mixture, and then the mixture is infused into the box-shaped structure formed by the first substrate 100 and the second substrate 200. At the moment, the infused nematic liquid crystal molecules 310 and negative dichroic dye molecules 330 are arranged to be parallel to the first substrate 100 under an orientation effect between the first orientation layer 120 and the second orientation layer 220. i.e. arranged horizontally.

(5) First ultraviolet light irradiation is performed on the box-shaped structure infused with the mixed solution, so that part of the polymerizable monomers in the mixed solution is induced by the first ultraviolet light irradiation to be prepolymerized to form a polymer cross-linked network skeleton structure. In this way, the polymer cross-linked network skeleton structure may be formed in an entire region of the box-shaped structure.

(6) The corresponding voltages are applied to the first strip-shaped electrodes 110, the second strip-shaped electrodes 210, the third transparent electrode layer and the fourth transparent electrode layer so that the low-frequency electric field is formed between the first strip-shaped electrodes 110 on the first substrate 100 and the second strip-shaped electrodes 210 on the second substrate 200, the low-frequency electric field is also formed between the third transparent electrode layer and the fourth transparent electrode layer, the liquid crystal molecules 310 are oriented with the electric field, and the negative dichroic dye molecules 330 are driven to be oriented accordingly.

(7) Second ultraviolet light irradiation is performed on the box-shaped structure, so that other polymerizable monomers in the polymerizable monomers are induced by the second ultraviolet light irradiation to be prepolymerized to form a polymer perpendicular network skeleton structure. In this way, the polymer cross-linked network skeleton structure and the polymer perpendicular network skeleton structure may be formed in the entire region of the box-shaped structure. Therefore, both the polymer cross-linked network skeleton structure and the polymer perpendicular network skeleton structure are formed in the first composite region SQ1 and the second composite region SQ2 of the composite material layer 300.

It should be noted that, after the low-frequency electric field is removed, the polymer perpendicular network skeleton structure may anchor the liquid crystal molecules 310 and the negative dichroic dye molecules 330 to continue to be arranged perpendicular to the first substrate 100.

Based on the same inventive concept, an embodiment of the present disclosure further provides a display device, including a display panel, and an anti-peeping panel located on a light emitting side of the display panel. For a specific structure of the anti-peeping panel, reference may be made to implementation of the above anti-peeping panel, and repeated description is not made here.

In addition, a problem solving principle of the display device is similar to that of the above anti-peeping panel, so for implementation of the display device, reference may be made to implementation of the above anti-peeping panel, and repeated description is not made here.

During specific implementation, in embodiments of the present disclosure, the display panel may be a liquid crystal display panel or an organic electroluminescence display panel.

During specific implementation, in embodiments of the present disclosure, the display device may be: a mobile phone, a tablet computer, a television, a monitor, a notebook computer, a digital photo frame, a navigator and other product or component with a display function. Other essential components of the display device should be understood by those of ordinary skill in the art, and will not be described in detail here, nor should it be regarded as a limitation to the present disclosure.

According to the above anti-peeping panel, the preparation method, the driving method and the display device provided by embodiments of the present disclosure, through the arrangement of the composite material layer having the first composite region and the second composite region, because the first composite region overlaps the first overlapping region, when the electric field of the first frequency exists between the first strip-shaped electrodes and the second strip-shaped electrodes, the second composite region may shade light, and the first composite region may transmit light, so an effect of anti-peeping display is realized; and when the electric field of the second frequency exists between the first strip-shaped electrodes and the second strip-shaped electrodes, the second composite region may transmit light, and the first composite region may transmit light, so an effect of shared display is realized.

Obviously, those of skill in the art can make various changes and modifications to the embodiments of the present disclosure without departing from the spirit and scope of the embodiments of the present disclosure. Thus, provided that these changes and modifications of the embodiments of the present disclosure fall within the scope of the claims of the present disclosure and their equivalents, the present disclosure is also intended to cover such changes and modifications.

The invention claimed is:

1. An anti-peeping panel, comprising:
a first substrate;
a second substrate, arranged opposite to the first substrate;
a composite material layer, encapsulated between the first substrate and the second substrate;
a first transparent electrode layer, located on a side facing the composite material layer, of the first substrate and comprising a plurality of first strip-shaped electrodes which are arranged at intervals; and
a second transparent electrode layer, located on a side facing the composite material layer, of the second substrate and comprising a plurality of second strip-shaped electrodes which are arranged at intervals, wherein an orthographic projection of at least one first strip-shaped electrode on the first substrate and an orthographic projection of at least one second strip-shaped electrode on the first substrate have a first overlapping region, wherein
the composite material layer comprises a first composite region and a second composite region, the second composite region overlaps the first overlapping region, and the composite material layer in the second composite region at least comprises two different polymer network skeleton structures;
in response to an electric field of a first frequency being between the first strip-shaped electrodes and the second strip-shaped electrodes, the second composite region shades light, and the first composite region transmits light;
in response to an electric field of a second frequency being between the first strip-shaped electrodes and the second strip-shaped electrodes, the second composite region transmits light, and the first composite region transmits light; and
the first frequency is different from the second frequency.

2. The anti-peeping panel according to claim 1, wherein the first frequency is smaller than the second frequency;
the composite material layer in the second composite region comprises: a first polymer network skeleton structure, a second polymer network skeleton structure, liquid crystal molecules, and positive dichroic dye molecules; and
the composite material layer in the first composite region comprises: the first polymer network skeleton structure, the liquid crystal molecules, and the positive dichroic dye molecules.

3. The anti-peeping panel according to claim 2, wherein the liquid crystal molecules and the positive dichroic dye molecules in the first composite region are respectively arranged parallel to the first substrate;
in response to the second composite region shading light, the liquid crystal molecules and the positive dichroic dye molecules in the second composite region are respectively arranged perpendicular to the first substrate; and
in response to the second composite region transmitting light, the liquid crystal molecules and the positive dichroic dye molecules in the second composite region are respectively arranged parallel to the first substrate.

4. The anti-peeping panel according to claim 2, wherein the first polymer network skeleton structures are polymer cross-linked network skeleton structures, and the second polymer network skeleton structures are polymer perpendicular network skeleton structures.

5. The anti-peeping panel according to claim 1, wherein the first frequency is larger than the second frequency; and
the composite material layers in the second composite region and the first composite region respectively comprise: a first polymer network skeleton structure, a second polymer network skeleton structure, liquid crystal molecules, and negative dichroic dye molecules.

6. The anti-peeping panel according to claim 5, wherein the liquid crystal molecules and the negative dichroic dye molecules in the first composite region are respectively arranged perpendicular to the first substrate;
in response to the second composite region shading light, the liquid crystal molecules and the negative dichroic dye molecules in the second composite region are respectively arranged parallel to the first substrate; and
in response to the second composite region transmitting light, the liquid crystal molecules and the negative dichroic dye molecules in the second composite region are respectively arranged perpendicular to the first substrate.

7. The anti-peeping panel according to claim 6, further comprising:
a third transparent electrode layer, located between the first substrate and the first transparent electrode layer, wherein an orthographic projection of the third transparent electrode layer on the first substrate and gaps between orthographic projections of the first strip-shaped electrodes on the first substrate comprise overlapping regions;
a first insulating layer, located between the third transparent electrode layer and the first transparent electrode layer;
a fourth transparent electrode layer, located between the second substrate and the second transparent electrode layer, wherein an orthographic projection of the fourth transparent electrode layer on the second substrate and gaps between orthographic projections of the second strip-shaped electrodes on the second substrate comprise overlapping regions; and
a second insulating layer, located between the fourth transparent electrode layer and the second transparent electrode layer.

8. The anti-peeping panel according to claim 7, wherein the orthographic projection of the third transparent electrode layer on the first substrate covers the first substrate; and/or
the orthographic projection of the fourth transparent electrode layer on the second substrate covers the second substrate.

9. The anti-peeping panel according to claim 1, wherein an orthographic projection of one of the first strip-shaped electrodes on the first substrate overlaps an orthographic projection of one of the second strip-shaped electrodes on the first substrate.

10. The anti-peeping panel according to claim 1, further comprising:
a first alignment layer, located between the first transparent electrode layer and the composite material layer, wherein an orthographic projection of the first alignment layer on the first substrate covers the first substrate; and
a second alignment layer, located between the second transparent electrode layer and the composite material layer, wherein an orthographic projection of the second alignment layer on the second substrate covers the second substrate.

11. A display device, comprising:
a display panel; and
an anti-peeping panel, located on a light emitting side of the display panel, wherein
the anti-peeping panel is the anti-peeping panel according to claim 1.

12. A driving method of the anti-peeping panel according to claim 1, comprising:
applying, in an anti-peeping display mode, opposite voltages to a first strip-shaped electrode and a second strip-shaped electrode so that an electric field of a first frequency exists between the first strip-shaped electrode and the second strip-shaped electrode, and controlling a second composite region to shade light and a first composite region to transmit light; and
applying, in a shared display mode, corresponding voltages to the first strip-shaped electrode and the second strip-shaped electrode so that an electric field of a second frequency exists between the first strip-shaped electrode and the second strip-shaped electrode, and controlling the second composite region to transmit light and the first composite region to transmit light.

* * * * *